United States Patent [19]

Borde et al.

[11] Patent Number: 4,593,538

[45] Date of Patent: Jun. 10, 1986

[54] REFRIGERATION CYCLE OPERATABLE BY LOW THERMAL POTENTIAL ENERGY SOURCES

[75] Inventors: Irena Borde; Yitzhak Yaron, both of Beer Sheva, Israel

[73] Assignee: Ben-Gurion University of the Negev Research and Development Authority, Beer Sheva, Israel

[21] Appl. No.: 653,080

[22] Filed: Sep. 21, 1984

[51] Int. Cl.$^4$ .............................................. F25B 15/10
[52] U.S. Cl. ......................................... 62/490; 62/112
[58] Field of Search ................................... 62/490, 112

[56] References Cited

U.S. PATENT DOCUMENTS

| | | | |
|---|---|---|---|
| 2,184,726 | 12/1939 | Ullstrand | 62/490 |
| 2,241,624 | 5/1941 | Smellie | 662/490 X |
| 2,354,884 | 8/1944 | Sherwood | 62/112 |
| 2,543,789 | 12/1950 | Miller et al. | 62/112 |
| 3,247,678 | 4/1966 | Mohlman | 62/434 X |
| 3,257,818 | 6/1966 | Papapanu | 62/185 X |
| 3,264,835 | 8/1966 | Holman et al. | 62/490 X |
| 4,078,392 | 3/1978 | Kestner | 62/434 X |
| 4,251,382 | 2/1981 | Li | 62/112 |
| 4,433,554 | 2/1984 | Rojey et al. | 62/112 |
| 4,448,031 | 5/1984 | Rojey et al. | 62/112 X |

*Primary Examiner*—Lloyd L. King
*Attorney, Agent, or Firm*—Sheridan Neimark; Karl W. Flocks

[57] ABSTRACT

The invention provides an absorption-refrigeration system including:

generator means in which the vapor of a volatile refrigerant, dissolved in an absorbent, is driven off the absorbent by heat exchange with a source of thermal energy;

condenser means in which the refrigerant vapor is turned into liquid refrigerant;

evaporator means in which the liquid refrigerant is turned into refrigerant vapor by heat exchange with the substance to be refrigerated, and absorber means in which the refrigerant vapor is redissolved in the absorbent to be recycled, characterized in that the refrigerant is selected from the group of fluoro-and fluoro-chloro-hydrocarbons, that the absorbent is an organic polar solvent possessing a strong chemical affinity with respect to the refrigerant, and that at least one of the heat exchanges involves direct contact between the partners to the heat exchange, which partners are mutually non-reactive and non-miscible.

7 Claims, 5 Drawing Figures

REFRIGERATION CYCLE OPERATABLE BY LOW THERMAL POTENTIAL ENERGY SOURCES

The present invention relates to a refrigeration process facilitating the utilization of sources of low thermal potential energy for refrigeration by direct contact evaporation of the refrigerant medium within the bulk of the material to be cooled. In the following, the term "low thermal potential energy sources" is understood to apply to such sources as are at temperatures of about 60° to 100° C. and are thus not suitable for direct generation of electrical energy.

The utilization of many common sources of low thermal potential energy, such as waste heat from industrial processing, solar energy as collected by conventional flat-plate solar collectors or solar ponds, and the like, for industrial and domestic heating purposes is well known and quite extensively practiced. Further extension of this utilization is usually restricted by incompatibility of needs of industrial plants for low thermal potential energy with available sources or by logistic difficulties imposed by the necessity to transfer these sources from sites of their generation (e.g. industrial centers) to sites of utilization (e.g. residential areas). The efficient and rational use of low-potential solar energy from conventional flat-plate collectors is limited by seasonal and daily variations in the amount of insolation, also subject to variation due to changes in climatic conditions, and therefore involves investment in heat-storage equipment. Utilization of solar energy is in many cases also prohibitive because of the high cost of materials required for the manufacture of improved-type flat-plate collectors.

The utilization of low thermal potential energy can be considerably expanded if directed toward refrigeration and cooling, alongside with heating. Many industrial plants which must at present dispose of their waste heat, require refrigeration for their techological processes and could readily utilize their waste heat to this end, if a method for such were available. Domestic refrigeration and cooling, rather than heating, is necessary in many parts of the world. These needs could also be provided for through use of presently not-utilized low thermal potential energy sources.

Since many of the most common uses of cooling are for domestic air conditioning, a large part of the energy requirements for such cooling can be provided by conventional flat-plate solar collectors, as long as the hours of need for cooling largely coincide with those of insolation. When continuous cooling and refrigeration are required, the restrictions and limitations imposed upon the possibility of utilization of low thermal potential energy sources will be similar to those imposed in the case of heating.

At present, refrigeration and cooling on both domestic and industrial scales is most commonly based on the use of compression machines, which are not suitable for utilization of low thermal potential energy, because compressors require electrical energy, usually generated by high-potential energy. Absorption refrigeration, in contradistinction, appears to be amenable for utilization of low thermal potential energy, inasmuch as energy is required in the thermal, and not electrical, form. Currently, commercial absorption refrigeration machines are run with ammonia-water or lithium bromide-water mixtures. These machines cannot be employed directly with low thermal energy sources of the kind considered hereabove, because generation of refrigerant vapors—ammonia in the case of ammonia-water systems, or water in the case of lithium bromide-water systems—requires heating-medium temperatures of well above 90° C. Many other refrigerating systems have been proposed and considered, but most of these suffer from shortcomings and limitations, e.g. toxicity, corrosiveness, explosibility, etc. of vapors or else high generation temperatures, which have prevented them from being widely implemented in commercial practice.

Another limitation imposed upon the use of commercial refrigeration machines employing ammonia-water or lithium bromide-water systems for cooling of aqueous streams in which a solid phase precipitates in the course, and as a result, of the cooling operation, lies in the fact that such cooling must be carried out by indirect heat transfer through metallic surfaces. Precipitation of solid phases upon such metallic heat-transfer surface reduces, and in many cases precludes, any possibility of cooling and, furthermore, presents considerable technical difficulties with regard to the withdrawal of the solid phases from the equipment.

These difficulties could most likely be overcome if the need to use metallic heat-exchange surfaces could be obviated, for instance by causing direct contact between the coolant and the aqueous medium. Unfortunately, this is not possible with presently available commercial absorption cooling machines, operating with ammonia-water or lithium bromide-water systems, because the respective refrigerants: ammonia or water, are soluble in aqueous streams and would thus be lost for the continuation of the refrigeration process. Various processes using volatile refrigerants have been devised for direct-contact cooling of aqueous streams in which solid phases may precipitate, but these suffer from several limitations, which cause their practical implementation to be difficult, economically not feasible, or altogether impossible. Thus, for instance a refrigeration process has been proposed by M.E. Aerov, T. A. Bystrova, N. I. Zelentsova and V. A. Kulikova, under British Patent No. 1,038,509, whereby "an absorbent comprising one or more heavy paraffin hydrocarbons (i.e. $C_5$ and higher) saturated with a refrigerant comprising one or more light paraffin hydrocarbons (i.e. $C_2$ to $C_4$) is heated by heat exchange with hot water or low-pressure steam so as to evolve refrigerant vapour, the evolved vapour is condensed by heat exchange with a cooling medium, the condensed refrigerant is evaporated by heat exchange with a medium to be operated, and the evolved vapour is re-absorbed in the absorbent, at least one of the aforementioned heat exchangers being carried out by direct contact between the heat-exchanging media."

Now, it is well known that the above-mentioned light paraffin hydrocarbons, i.e., $C_2$ to $C_4$, are highly flammable substances which, upon prevailing conditions of operation, constitute an explosion hazard. Moreover, at least one of these is known to form hydrate phases with aqueous systems, which phases can cause major operational difficulties that are liable to render the entire process impracticable. That the inventors of this prior-art process are aware of this become quite clear from the fact that, as a remedial measure, they propose the supply, to the evaporator as well as to the expansion valve upstream of the evaporator, of electrolyic aqueous solutions which are supposed to break up such hydrate deposits. Such measures, however, result in major operation difficulties and are the cause of further expenses. The inventors also admit that in the major components of their device, i.e., the condenser, the absorber and the cooler small amounts of the hydrocarbon refrigerant may be lost through dissolution in water and the recovery thereof requires passing said water through a column, to be blown through with methane or a methane hydrogen fraction, a costly and cumbersome addition.

Another very serious drawback of this prior-art system resides in the fact that, given the types of refrigerants and absorbents proposed by this system, the boiling-point difference between refrigerant and absorbent may be as low as 36° C., (e.g. with $C_4$ as refrigerant and $C_5$ as absorbent), as a result of which the refrigerant vapors evolving in the generator will inevitably contain a substantial amount of absorbent vapors, the removal of which necessitates rectification, involving yet another component. The efficiency of this prior-art system is rather low, even taking the more favorable Example 1 which claims a thermal efficiency of 0.26. This would correspond to a coefficient of performance (COP) of about 0.2.

It is one of the purposes of the present invention to overcome the shortcomings and limitations discussed hereabove and to facilitate efficient utilization of low thermal potential energy sources for cooling and refrigeration.

This the invention achieves by providing an absorption-refrigeration system including:

generator means in which the vapor of a volatile refrigerant, dissolved in an absorbent, is driven off said absorbent by heat exchange with a source of thermal energy;

condenser means in which said refrigerant vapor is turned into liquid refrigerant;

evaporator means in which said liquid refrigerant is turned into refrigerant vapor by heat exchange with the substance to be refrigerated, and absorber means in which said refrigerator vapor is redissolved in said absorbent to be recycled, characterized in that said refrigerant is selected from the group of fluoro- and fluoro-chloro-hydrocarbons, that said absorbent is an organic polar solvent processing a strong chemical affinity with respect to said refrigerant, and that at least one of said heat exchanges involves direct contact between the partners to said heat exchange, which partners are mutually non-reactive and non-miscible.

As will be shown in the examples cited herebelow, operation of absorption refrigeration machines with the above-mentioned working fluids has the advantage of permitting utilization of low thermal potential energy sources in the sense employed in the present specification, namely in the temperature range of 60° to 90° C. A further advantage of the present invention lies in the fact that use is made of non-corrosive, non-toxic, non-flammable, inexplosive, non-irritant, etc. refrigerants, commercially known under the name of Freons, the boiling points of which can be up to 320° C. lower than those of the organic polar solvents proposed as absorbents. Moreover, aqueous streams in which precipitation takes place in the course of refrigeration and in which previously difficulties were encountered in refrigeration by indirect heat transfer via metallic surfaces because of precipitation of solid phases upon such metallic surfaces, can now be most efficiently cooled by direct-contact evaporation of the refrigerant within the aqueous medium. Such a method of cooling is made possible in view of the fact that the above specified refrigerant is completely insoluble in, and immiscible with, aqueous media.

The principle of direct-contact heat exchange is also applicable where heat has to be supplied as, e.g., in the generator, and the present invention in fact obviates the need for metallic heat-transfer surfaces wherever heat is exchanged between the working fluid of the absorption refrigeration machine and a medium which supplies or withdraws heat, provided the medium is immiscible with the working fluid. Many of the low thermal potential energy sources available, such as the low pressure steam, steam condensate, hot water or hot aqueous waste s treams from industrial processes, hot geothermal water, etc., are generally immiscible with the fluorochlorohydrocarbon type refrigerant component of the working fluid of the refrigerant process and with the organic solvents employed as absorbents for this refrigerant and may thus be used in direct contact with the working fluids to generate refrigerant vapors in the generator component of the system. Furthermore, it is obvious that such direct-contact heat transfer could not be achieved with conventional working fluids, namely ammonia/water or water/lithium bromide solutions, which are miscible with the low thermal potential energy sources mentioned.

In absorption refrigeration systems, heat has to be withdrawn also from the working fluid in the condenser and the absorber components of the system. While in some instances such withdrawal of heat is achieved by transfer of heat to ambient air, in many practical systems use is made of cooling water. Again, in such cases, it is a feature of the present invention that it permits withdrawal of such process heat to cooling water by direct thermal contact, obviating the need for metallic heat transfer surfaces.

Muriate of potash, to illustrate a typical field of application of the present invention, is currently produced from brines via a series of evaporation and crystallization processes, some of which are carried out in solar evaporation ponds. At the end of the production operations the barren solution, generally known as end brine, which still contains appreciable quantities of dissolved muriate of potash, is discarded, since recovery of the balance of the potash is unfeasible in view of the cost of additional solar evaporation pans, or of energy otherwise necessary to evaporate the brines and bring about crystallization of the balance of the potash.

Recovery of such potash could be achieved by chilling the end brines to a temperature at which they become saturated with respect to the potash. It should be clear, however, that chilling of these brines by indirect cooling through metallic heat transfer surfaces cannot be carried out economically, since precipitation of crystals upon the heat transfer surfaces drastically reduces the efficiency of the heat transfer process and subjects the crystallization equipment to the danger of complete blockage. Here the advantage of the present invention is obvious. Liquid Freon, as obtained in the absorption refrigeration installation after condensation of Freon vapors produced in the generator by heating with brines emerging from a solar pond, or any other device utilizing low thermal-potential solar energy, can be introduced counter-currently to the end brine in a dispersed state in a direct-contact crystallizer. Separation of the vapor-phase evaporated Freon from the end brine does not permit operational problems. The separated vapors are readily absorbed in a suitable organic solvent, and the concentrated solution is returned to the generator for continuation of the process. It is evident that in the case cited conventional absorption-refrigeration working fluids, e.g. ammonia-water and lithium bromide-water, are unsuitable, since the volatile phase—ammonia in the former, and water in the latter fluid—are greatly soluble in the end brine.

A further example of the possible application of the present invention relates to desalination of sea water, brines, brackish water, and the like. Among the many methods proposed, the method of desalination through chilling until crystallization of a pure ice phase results, has not achieved economical feasibility mainly due to the high costs of the refrigeration operation. In those desalination installations which have hitherto been considered and tested on an experimental scale, compression refrigeration was used, in which a condensed refrigerant, e.g. liquid butane, was brought into contact with the saline aqueous phase, evaporation of the refrigerant causing crystallization and precipitation of the pure ice phase. The vaporized refrigerant had to be recompressed, however, in order to facilitate its condensation and thus permit continuation of the process. Application of the present invention to the process of desalination, whereby the high costs of recompression are obviated by the use of reabsorption of refrigerant vapors in a suitable organic solvent, and the energy necessary for generation of the vapors is provided by cheap low thermal potential energy sources, is clearly advantageous in comparison to the method of compression refrigeration previously described. It is again clear that the use of conventional absorption-refrigeration working fluids, viz. ammonia/water and lithium bromide/water, is not possible, in view of the high solubility of the volatile components, ammonia or water, respectively, in the saline phase.

The invention will now be described in connection with certain preferred embodiments with reference to the following illustrative figures so that it may be more fully understood. It is stressed, however, that the particulars shown and described are by way of example and for purposes of illustrative discussion only and are presented in the cause of providing what is believed to be the most useful and readily understood description of the principles and conceptual aspects of the invention. In this regard no attempt is made to show structural details of the system and its component parts in more detail than is necessary for a fundamental understanding of the invention, the description taken with the drawings making apparent to those skilled in the art how the several forms of the invention may be embodied in practice.

Figure 1:
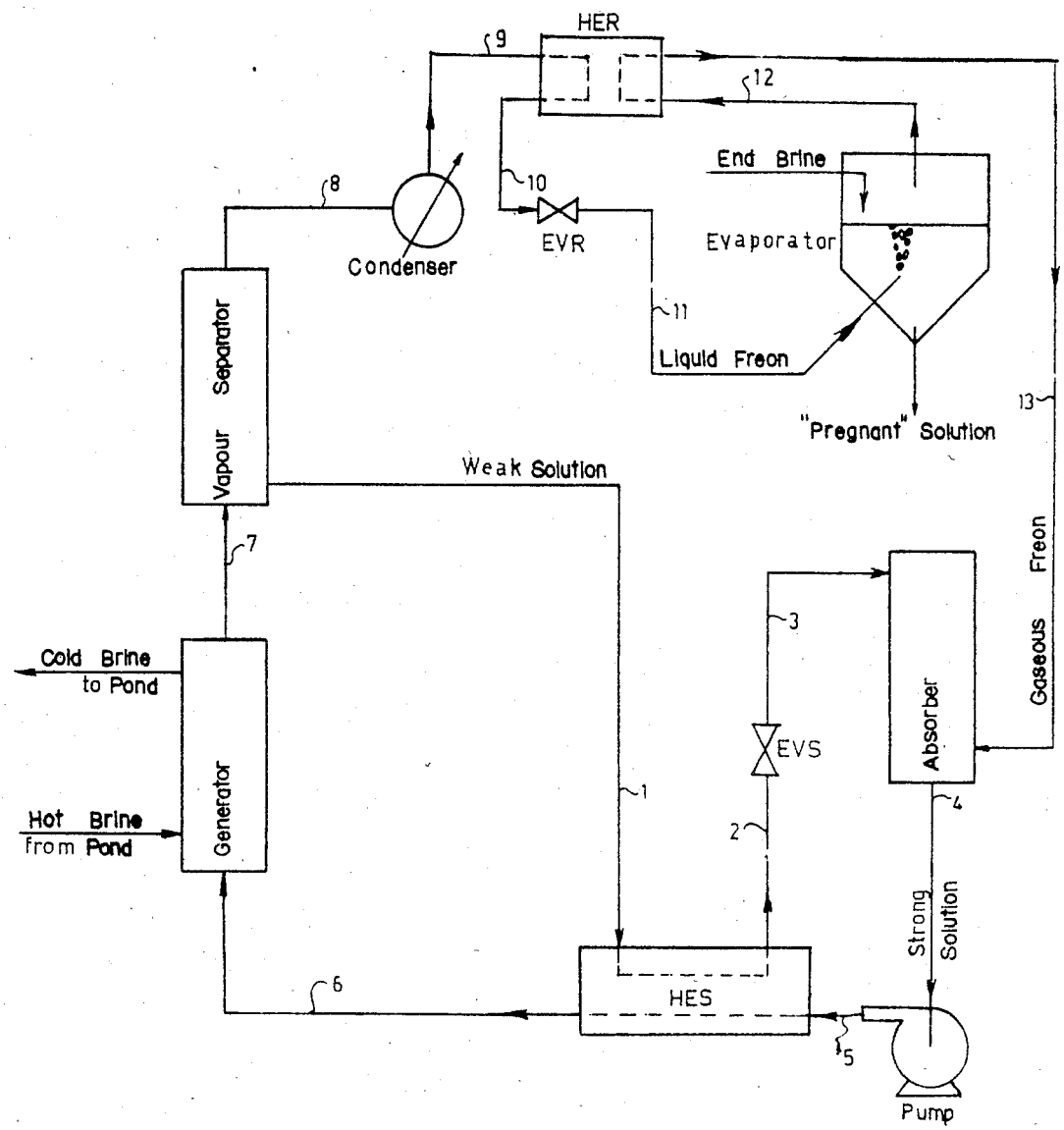
FIG. 1 is a schematic diagram of a first embodiment of the invention.

Referring now to the drawings, there is shown in FIG. 1 an absorption-refrigeration plant according to the invention, designed for the above-mentioned treatment of the end brine of muriate of potash. Here, the concentrated or "strong" solution consisting of the refrigerant selected from the series of fluoro- and fluoro-chloro hydrocarbons commercially known as Freons, and a suitable organic solvent which possesses high chemical affinity for the refrigerant, and also other desired properties, e.g., chemical stability, inertness, low volatility, non-toxicity, etc., is pumped from the absorber by means of a mechanical pump or other device to the generator G. On its way, this strong solution is heated by energy exchange with the depleted or "weak" solution in the solution-line heat exchanger HES. The strong solution is further heated in the generator by means of low thermal-potential energy sources, as mentioned previously, which causes the refrigerant vapors dissolved in the strong solution to be driven off. The vapors thus generated are separated from the weak solution in the separator and are passed on to the condenser C. The weak solution is returned to the absorber via solution-line heat exchanger HES and solution-line expansion valve EVS, and the refrigerant vapors are condensed in the condenser C by withdrawal of heat. The liquid refrigerant is further cooled by heat exchange with the evaporated refrigerant in the refrigerant-line heat exchanger HER. Following reduction of the pressure of the liquid refrigerant by refrigerant-line expansion valve EVR, the refrigerant is caused to evaporate in the evaporator by direct contact with the end brine. At this point, heat is removed from the end brine and transferred to the evaporating refrigerant. As stated before, the vaporized refrigerant is thermally contacted in heat exchanger HER and then reabsorbed in the weak solution in the absorber, where the heat of dissolution is removed. In FIG. 1 the various stations in the refrigeration cycle are indicated by numbers, to which reference will be made in the thermodynamic diagrams of one representative refrigerant/solvent system.

Figure 2:
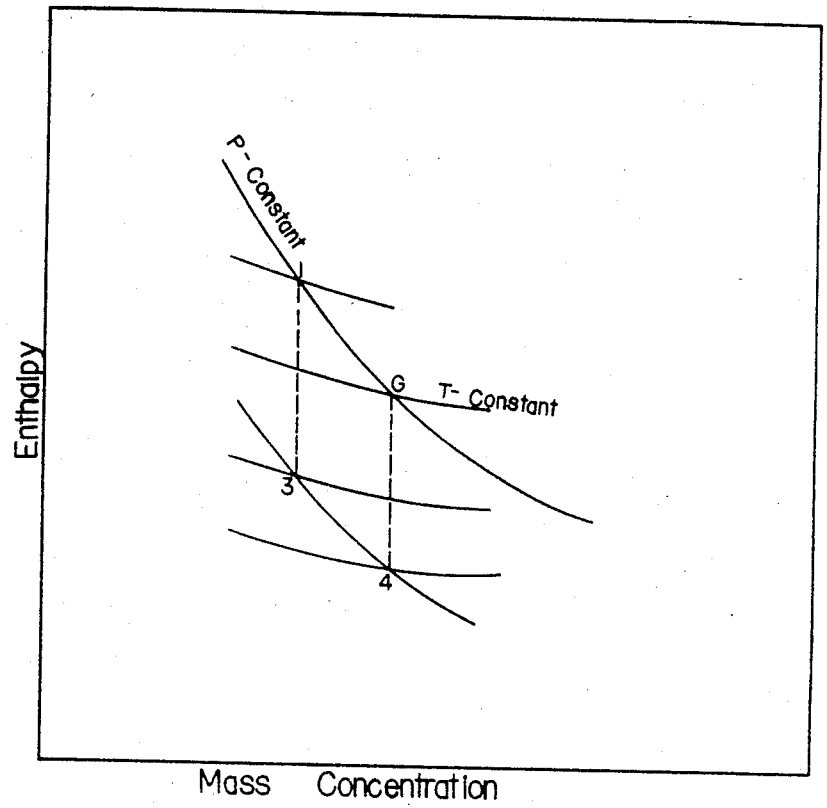
FIG. 2 is a schematic enthalpy-concentration diagram of the system Freon 22/dibutyl phtalate.
Figure 4:
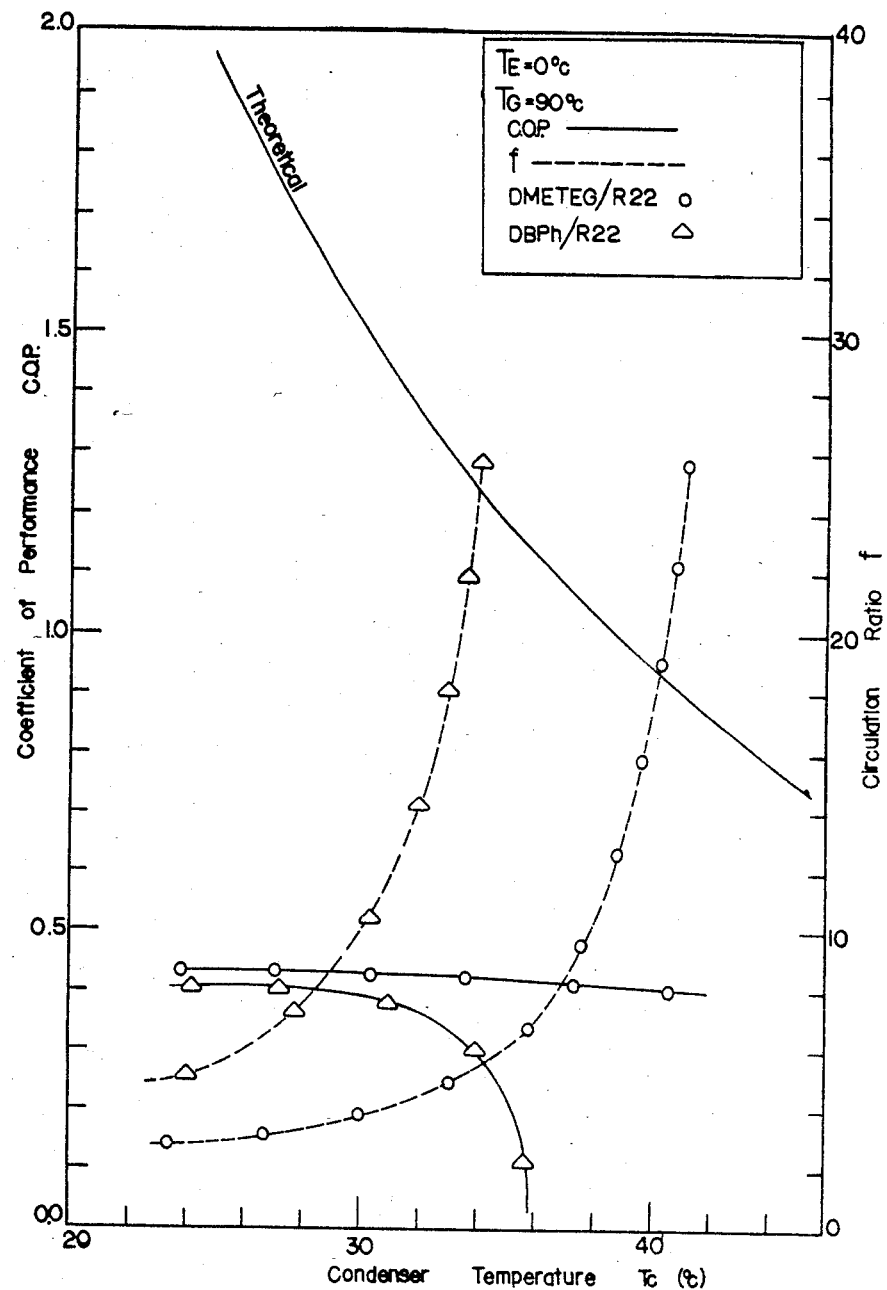
FIG. 4 is a diagram showing the coefficient of performance and the circulation coefficient as calculated for a variety of operating conditions and for various refrigerant systems.

Since the difference in boiling temperatures of Freon refrigerants and suitable organic solvents can be very high, it is possible to represent processes taking place in the solution and with the pure refrigerant on separate thermodynamic diagrams. FIG. 2, for example, is an enthalpy-concentration diagram of the system Freon 22/dibutyl phthalate. This system is typical of the working fluid systems suitable for use in conjunction with the present invention. Processes taking place in the solution are represented in this diagram, while FIG. 4 is the pressure-enthalpy diagram of pure Freon 22 and describes processes involving pure Freon 22.

Figure 3:
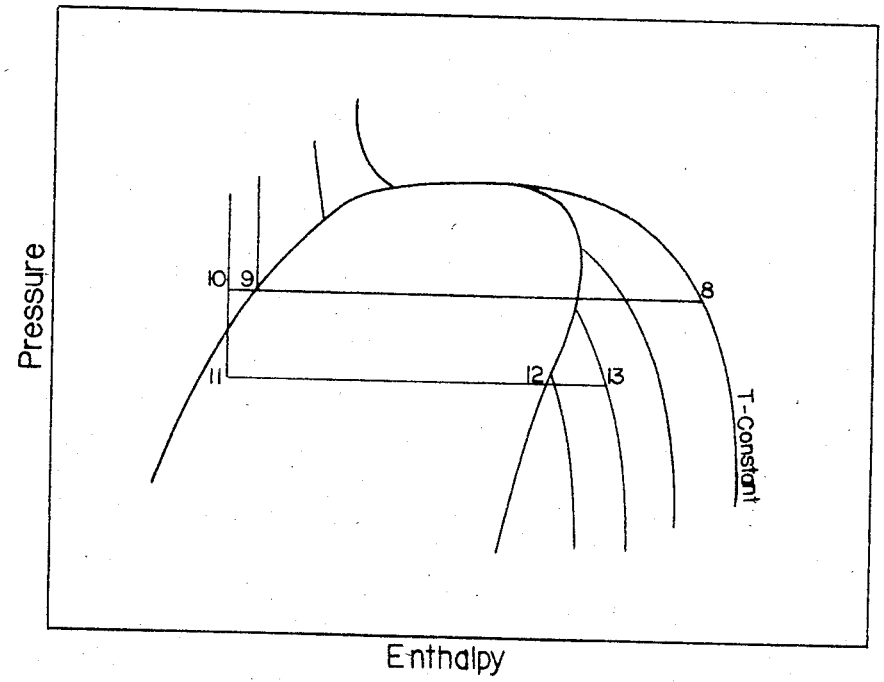
FIG. 3 represents a schematic pressure-enthalpy diagram of pure Freon 22.

The process of heating the strong solution is represented in FIG. 2 by the lines 4-G (pumping and heating at constant concentration) and G-1 (evaporation in the generator at constant pressure and varying concentration). The process of cooling and reducing the pressure of the weak solution is represented by line 1-3 (constant concentration) and the absorption process at constant pressure is represented by line 3-4. Condensation of Freon 22 in the condenser takes place in two stages: first superheated Freon cools at constant pressure to saturation, and then the saturated vapors condense at constant pressure and temperature. The complete process is represented by line 8-9 (FIG. 3). Liquid Freon is cooled in the heat exchanger HER at constant pressure to point 10 in the diagram. The evaporation process again takes place in two stages: stage 10-11 is an isenthlpic expansion through valve EVR, resulting in a vapor-liquid mixture, and then an isobaric and isothermal evaporation 11-12, until saturated vapor Freon 22 obtains.

Next, the saturated vapor is superheated in the heat-exchanger HER in step 12-13. The remainder of the refrigeration cycle occurs, as stated previously, in the absorber in the solution phase and is represented by line 3-4 in FIG. 2. Similar diagrams have been constructed for other refrigerant systems.

Two important indicators of a refrigeration cycle are: the coefficient of performance, COP, defined as the ratio of the energy absorbed by the refrigerant in the evaporator, to the energy invested in the generator, and the circulation coefficient, f, defined as the ratio of the mass flow rates of the strong solution and the refrigerant. With the aid of thermodynamic diagrams, as exemplified by FIGS. 2 and 3, both indicators have been calculated for a variety of operating conditions and for various refrigerant systems and are typically represented in FIG. 4, which phorus variation of the coefficient of performance and the circulation coefficient of absorption refrigeration cycles, operatign with Freon 22/dibutyl phthalate and Freon 22/dimethyl ether or tetraethylene glycol, at condenser temperatures $T_c$, constant generator temperature ($T_G=90°$ C.) and constant evaporator temperature ($T_E=0°$ C.).

It is possible to operate the complete refrigeration installation at a single constant total pressure without the need to reduce the pressure of the condensed refrigerant by means of an isenthalpic expansion valve, such as valve EVR. This can be realized by maintaining an inert, noncondensible gas in the evaporator in such a way that the partial pressure of the refrigerant in that unit is lower than the total pressure of the system. The use of such an inert gas obviates the necessity for a mechanical pump to elevate the pressure of the concentrated solution prior to its entry into the generator.

Figure 5:
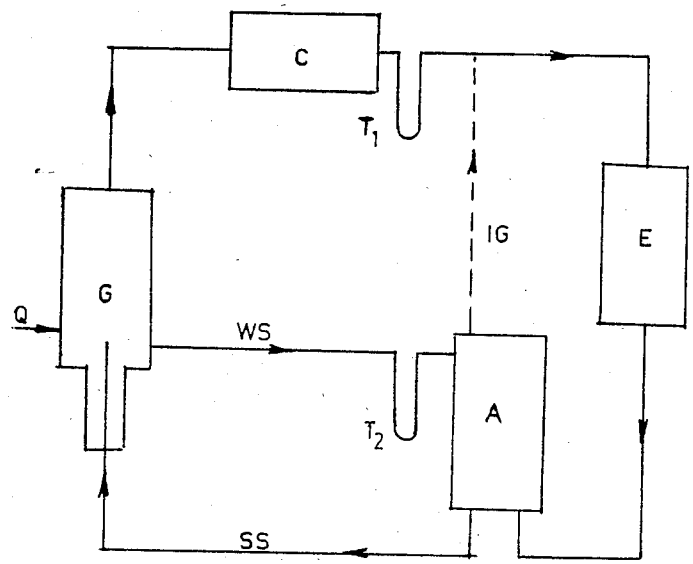
FIG. 5 is a schematic diagram of another embodiment of the invention.

FIG. 5 is a schematic representation of such an arrangement, in which for the sake of simplicity the heat exchangers have been omitted. Seen are the generator G, the condenser C, the evaporator E and the absorber A. Somewhat simplified, the condition obtains: $P_{RV}=P_{TOT}-P_{IG}$, where $P_{RV}$=partial pressure of the refrigerant vapor in the evaporator E, $P_{TOT}$=total pressure of the system, and $P_{IG}$=partial pressure of the inert gas in the evaporator. To confine the inert gas to the evaporator-absorber circuit, two liquid seals $T_1$ and $T_2$ are provided. Inert gas entering the absorber returns to the evaporator via an inert-gas line IG and can pass neither $T_1$ nor $T_2$. Inert gases suitable for the above arrangement are, e.g. hydrogen or helium.

It will be appreciated that, as already stated, this embodiment of the invention requires neither an expansion valves, nor any pumps: the weak solution WS returns to the absorber A by gravity flow and the strong solution SS is drawn up into the generator G by a thermosyphon action set up when the contents of the generator G are heated by the thermal input Q.

While in the above examples direct-contact heat exchange was seen to refer only to such system components as generator and evaporator, it should be clear that this heat-exchange principle can be applied also to the removal of the heat of condensation in the condenser C, and the heat of dissolution in the absorber A.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An absorption-refrigeration system comprising:
a volatile refrigerant selected from the group consisting of fluoro- and fluoro-chloro-hydrocarbons;
an absorbent consisting essentially of an organic polar solvent possessing a strong chemical affinity for said refrigerant;
means, comprising a generator having a solution of said refrigerant in said solvent therein for vaporizing said refrigerant from said solution by heat exchange with a source of thermal energy, said solution and said thermal energy source being partners defining a first heat-exchange partner pair;
means for condensing said refrigerant to form a refrigerant, vapor by heat exchange with a substance to be refrigerated said refrigerant vapor and said substance to be refrigerated being partners defining a second heat-exchange partner-pair;
absorbing means for dissolving said refrigerant vapor in said absorbent to reform said solution; and
means, for continuously circulating said solution through said generator including means for recycling said reformed solution to said generator;
at least one of said first and second heat-exchange partner-pairs comprising mutually non-reactive and immiscible partners; and
at least one of said generator means and said evaporating means including means for direct heat exchange between said at least one heat-exchange partner-pair.

2. The absorption-refrigeration system as claimed in claim 8, wherein said system includes an inert, non-condensible gas.

3. The absorption-refrigeration system as claimed in claim 2, wherein said inert, non-condensible gas is substantially confined to those sections of said system in which evaporation of said refrigerant takes place.

4. The absorption-refrigeration system as claimed in claim 3, further comprising liquid seals between said evaporator and said condenser, and between said generator and said absorber, upstream of said absorber, for confining said gas to said sections.

5. The absorption-refrigeration system as claimed in claim 2, wherein said inert, non-condensible gas is hydrogen.

6. The absorption-refrigeration system as claimed in claim 2, wherein said inert, non-condensible gas is helium.

7. The absorption-refrigeration system as claimed in claim 1, wherein the difference between the respective boiling points of said refrigerant and said absorbent is at least 200° C.

* * * * *